(12) United States Patent
Cranfill et al.

(10) Patent No.: US 6,318,293 B1
(45) Date of Patent: Nov. 20, 2001

(54) AQUARIUM CORNER GUARDS

(76) Inventors: Craig Cranfill; Robert L. Brinegar, both of 205 Laayette St., St. Marys, WV (US) 26170

( * ) Notice: Subject to any disclaimer, the term of this patent is extended or adjusted under 35 U.S.C. 154(b) by 0 days.

(21) Appl. No.: 09/549,938

(22) Filed: Apr. 14, 2000

(51) Int. Cl.$^7$ .................................................. A01K 63/00
(52) U.S. Cl. ........................................................... 119/245
(58) Field of Search ................................ 119/245, 269, 119/247; 108/27

(56) References Cited

U.S. PATENT DOCUMENTS

| | | | |
|---|---|---|---|
| 3,677,433 | * 7/1972 | Collins | 220/4.01 |
| 3,864,653 | * 2/1975 | Walker | 335/285 |
| 4,576,115 | 3/1986 | Gordon . | |
| 4,582,739 | 4/1986 | Givens . | |
| 4,674,758 | 6/1987 | Valley et al. . | |
| 4,810,550 | 3/1989 | Gasser . | |
| 4,920,922 | 5/1990 | Tominaga . | |
| 5,208,084 | * 5/1993 | Rutz | 428/40.1 |
| 5,313,754 | * 5/1994 | Jensen | 52/255 |
| 5,445,112 | 8/1995 | Grosman . | |
| 5,479,884 | 1/1996 | Grosman . | |
| 5,488,931 | 2/1996 | Grosman . | |
| 5,809,901 | 9/1998 | Gutzmer . | |
| 5,857,430 | * 1/1999 | Griffiths | 119/256 |
| 5,988,109 | * 11/1999 | Rofen | 119/245 |

\* cited by examiner

*Primary Examiner*—Charles T. Jordan
*Assistant Examiner*—John W. Zerr
(74) *Attorney, Agent, or Firm*—John D. Gugliotta

(57) ABSTRACT

A corner guard assembly is provided for use with an otherwise conventional aquarium. The corner guard assembly has an outer aesthetic cap, generally "L" shape, having a magnet attached to the inside surface and a layer of felt attached, covering the magnet. An oppositely polar inner retaining magnet, in a generally "L" shape, is place on an inside of an aquarium and holds the outer cap to cover the corners of the aquarium.

5 Claims, 2 Drawing Sheets

AQUARIUM CORNER GUARDS

RELATED APPLICATIONS

The present invention was first described in Disclosure Document No. 466,941 filed on Dec. 27, 1999. There are no previously filed, nor currently any co-pending applications, anywhere in the world.

BACKGROUND OF THE INVENTION

1. Field of the Invention

The present invention relates generally to guards for edges on tables and the like and, more particularly, to a corner guard for aquariums.

2. Description of the Related Art

Keeping pets such as fish, reptiles, hamsters and the like in a glass aquarium is a never-ending task, requiring one to constantly clean and maintain the tank for the benefit of the pets. One fact that rapidly becomes evident to those owning a glass aquarium tank is that the outer edges are extremely fragile. They are easily chipped and/or nicked especially when in transit or storage. While the damage usually does not affect the usability of the tank, it is unsightly and perhaps more important, it is dangerous should someone accidentally run their hand along the edge and cut themselves.

In the related art, numerous attempts have been made to correct for the foregoing problems. U.S. Pat. No. 5,809,901 issued in the name of Gutzmer, and U.S. Pat. No. 4,810,550 issued in the name of Gasser disclose a protective table edge capable of absorbing an impact. U.S. Pat. No. 5,488,931, U.S. Pat. No. 5,445,112 and U.S. Pat. No. 5,479,884, all issued in the name of Grosman, describe a mesh cover for attachment to a terrarium or aquarium.

U.S. Pat. No. 4,920,922 issued in the name of Tominaga discloses an aquarium lid with a protruding longitudinal edge.

U.S. Pat. No. 4,674,758 issued in the name of Valley et al. describes a teething guard for a shopping cart.

U.S. Pat. No. 4,582,739 issued in the name of Givens discloses a removable, protective bumper for corners and edges of furniture.

U.S. Pat. No. 4,576,115 issued in the name of Gordon describes a flat screen cover for an animal or fish tank.

Accordingly, there is a need for a means by which glass aquariums can be protected from corner damage or by which such previously inflicted damage can be covered from view.

SUMMARY OF THE INVENTION

Therefore, it is an object of the invention to indicate a device of the type disclosed above which avoids the disadvantages inherent in the state of the art. In particular, the device is to be attachable for use with an aquarium or terrarium for protection of the unit's corners.

It is therefore an object of the present invention to provide an improved aquarium corder guard that is attachable to the unit's corners without penetrating the aquarium's sidewalls.

Briefly described according to one embodiment of the present invention, an aquarium corner guards, as their name implies, is a system and method by which the outer corners of glass fish tanks are protected from damage and/or are covered to conceal prior damage. The outer "L"-shaped portion consists of three layers. First, the outermost layer, visible to observers, is a plastic cover. The plastic cover can be made in a multitude of colors and styles to match either the tank accessories or the room decor. The next or middle layer is a magnet, envisioned to be of the flexible variety. Finally, the innermost layer is a layer of felt to protect the glass of the fish tank from being scratched by the magnet. The inner "L"-shaped portion of the invention is a magnet only. This portion goes on the inside of the tank and allows the outer portion of the invention to be held is place by magnetism.

An advantage of the present invention is that it may be used while moving or storing the fish tank to protect the glass edges or may be used while the tank is in use to conceal prior nicks and chips. Such concealment obviously protects those who may run their hand over the edge of the glass from cuts.

Further, the use of the present invention provides protection for new tanks as well as adding life and usefulness to old fish tanks.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE PREFERRED EMBODIMENT

Figure 1:
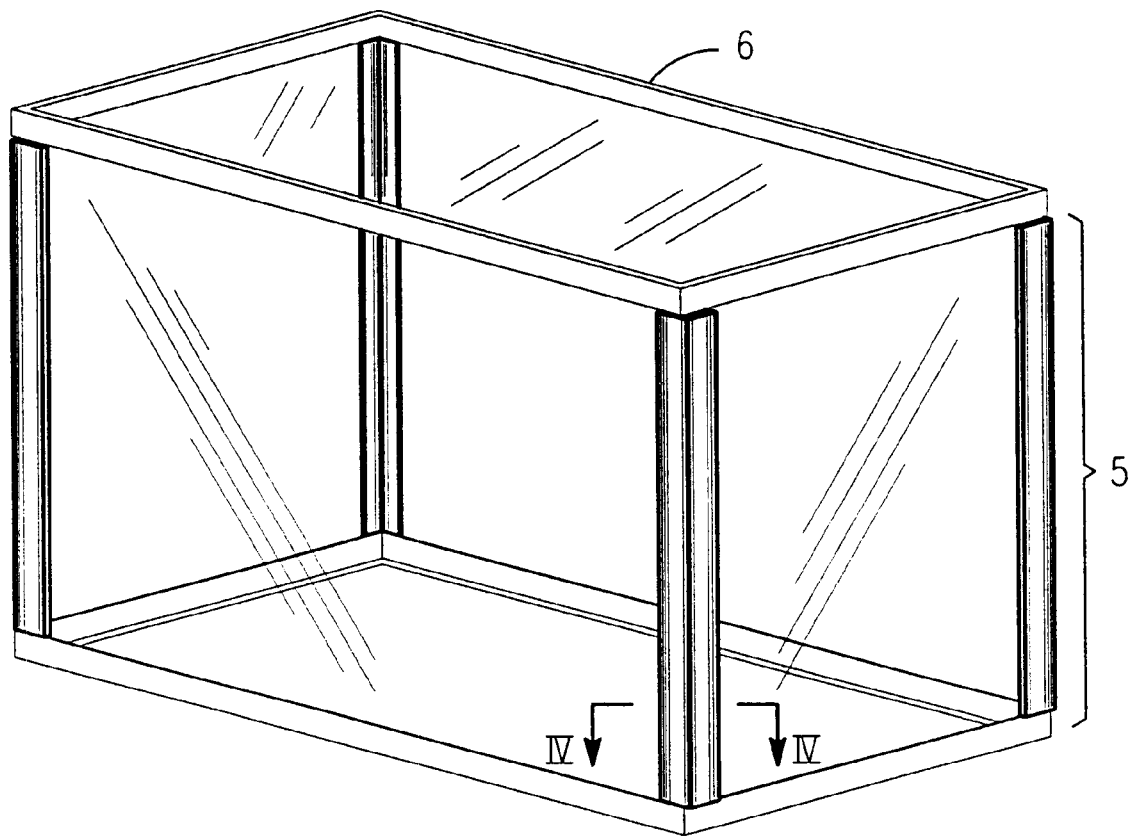
FIG. 1 is a perspective view of an aquarium shown installed with aquarium corner guards according to the preferred embodiment of the present invention.
Figure 2:
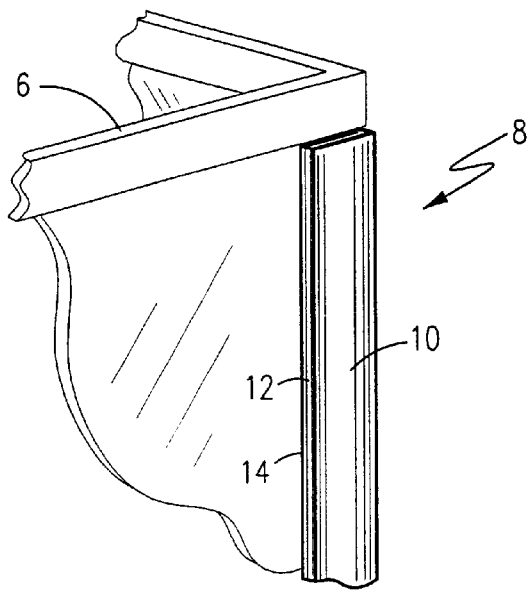
FIG. 2 is a partial exploded perspective view thereof.
Figure 3:
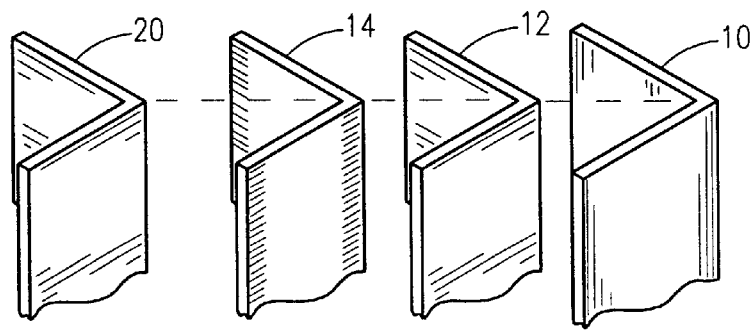
FIG. 3 is an exploded elevational view of an aquarium corner guard according to the preferred embodiment thereof.
Figure 4:
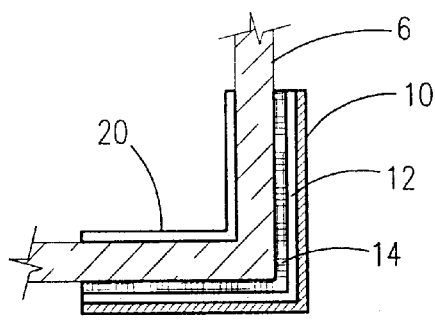
FIG. 4 is a cross sectional view thereof taken along line IV—IV of FIG. 1.

Referring now to FIGS. 1–4, an aquarium corner guard assembly 5 is shown, according to the present invention, for use with an otherwise conventional aquarium 6. The aquarium corner guards 5, as their name implies, is a system and method by which the outer corners of glass fish tanks 6 are protected from damage and/or are covered to conceal prior damage. An outer "L"-shaped cap portion 8 consists of three layers. First, the outermost layer 10, visible to observers, is a plastic cover. The plastic cover can be made in a multitude of colors and styles to match either the tank accessories or the room decor. The next or middle layer 12 is a magnet, envisioned to be of the flexible variety. Finally, the innermost layer 14 is a layer of felt to protect the glass of the fish tank from being scratched by the magnet. An inner "L"-shaped retaining portion 20 of the invention is a magnet only. This portion 20 goes on the inside of the tank 6 and allows the outer portion 8 to be held is place by magnetism.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A corner guard assembly for use with an otherwise conventional aquarium, said corner guard assembly comprising:

an outer cap, said outer cap capable of being attracted magnetically, wherein said outer cap is formed in a generally "L" shape, and further comprises:

an outermost layer forming a decorative outer cover and an inner surface;

a middle layer, said middle layer being a magnet and affixed to the inner surface of the outermost layer; and an innermost protective layer for protecting glass of the fish tank from being scratched by said middle layer;

an inner retaining magnet;

and wherein when said inner retaining magnet is placed on an inside of an aquarium said outer cap can be held in place by magnetism and thereby cover outer corners of an aquarium.

2. The corner guard assembly of claim 1, wherein said outermost layer forms a plastic cover capable of being formed in an aesthetically pleasing color and style.

3. The corner guard assembly of claim 1, wherein said middle layer formed directly of a flexible magnet.

4. The corner guard assembly of claim 1, wherein said innermost protective layer is formed of felt fabric.

5. The corner guard assembly of claim 1, wherein said inner retaining magnet is formed in a generally "L"-shape.

* * * * *